March 17, 1959  L. J. BISHOP  2,877,524
APPARATUS FOR MIXING AND FEEDING SHELL MOLDING MATERIAL
Filed July 1, 1954  3 Sheets-Sheet 1
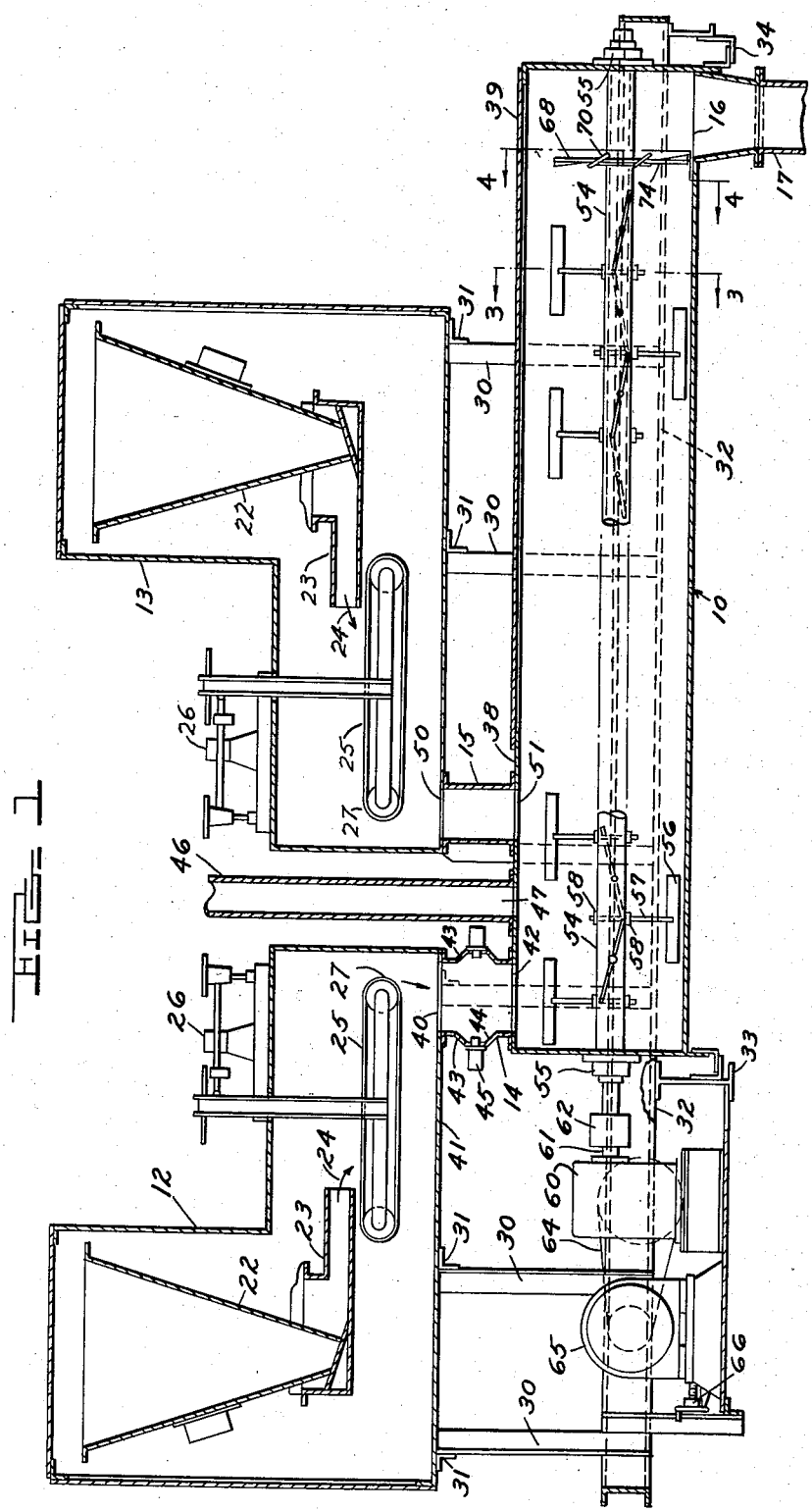

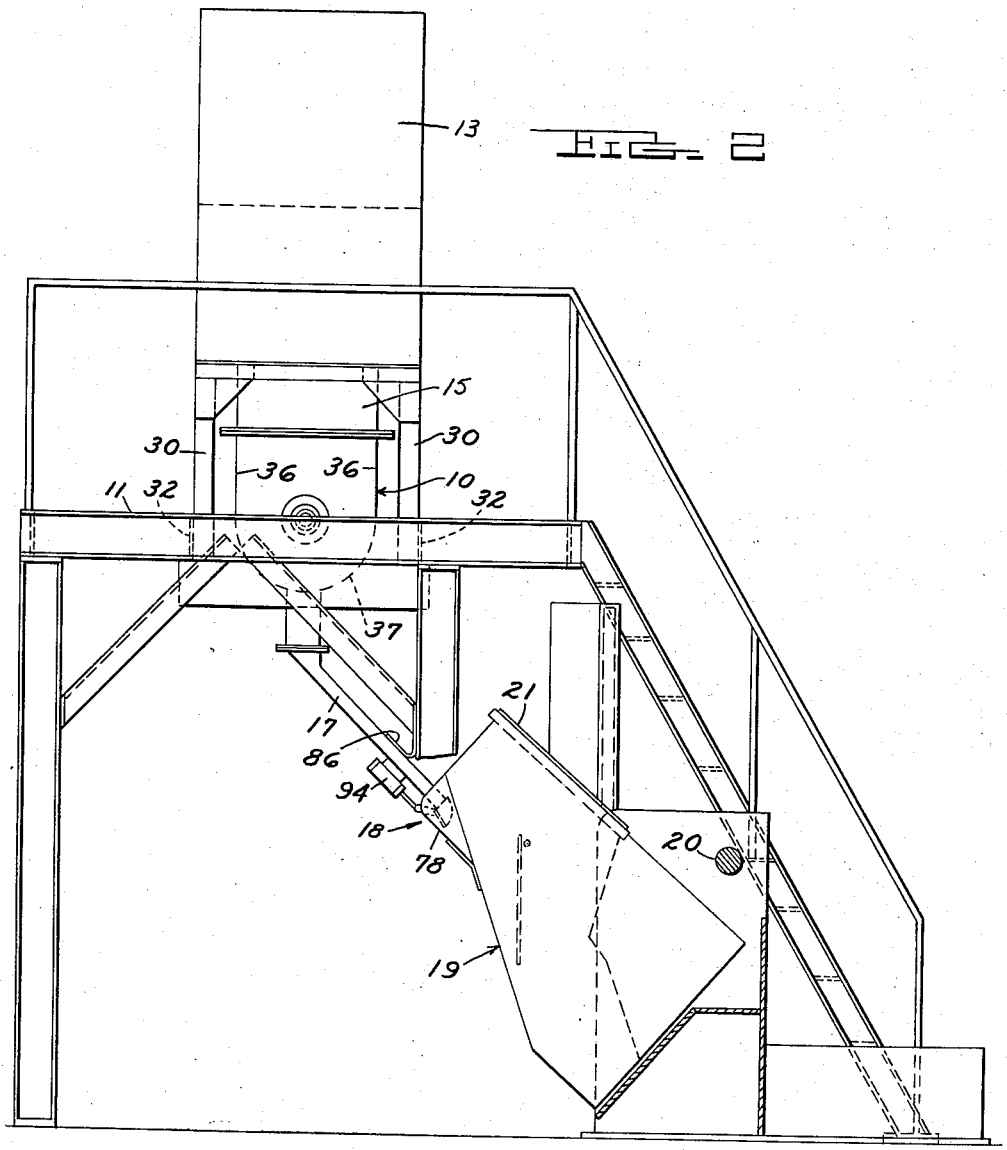

March 17, 1959 L. J. BISHOP 2,877,524
APPARATUS FOR MIXING AND FEEDING SHELL MOLDING MATERIAL
Filed July 1, 1954 3 Sheets-Sheet 3
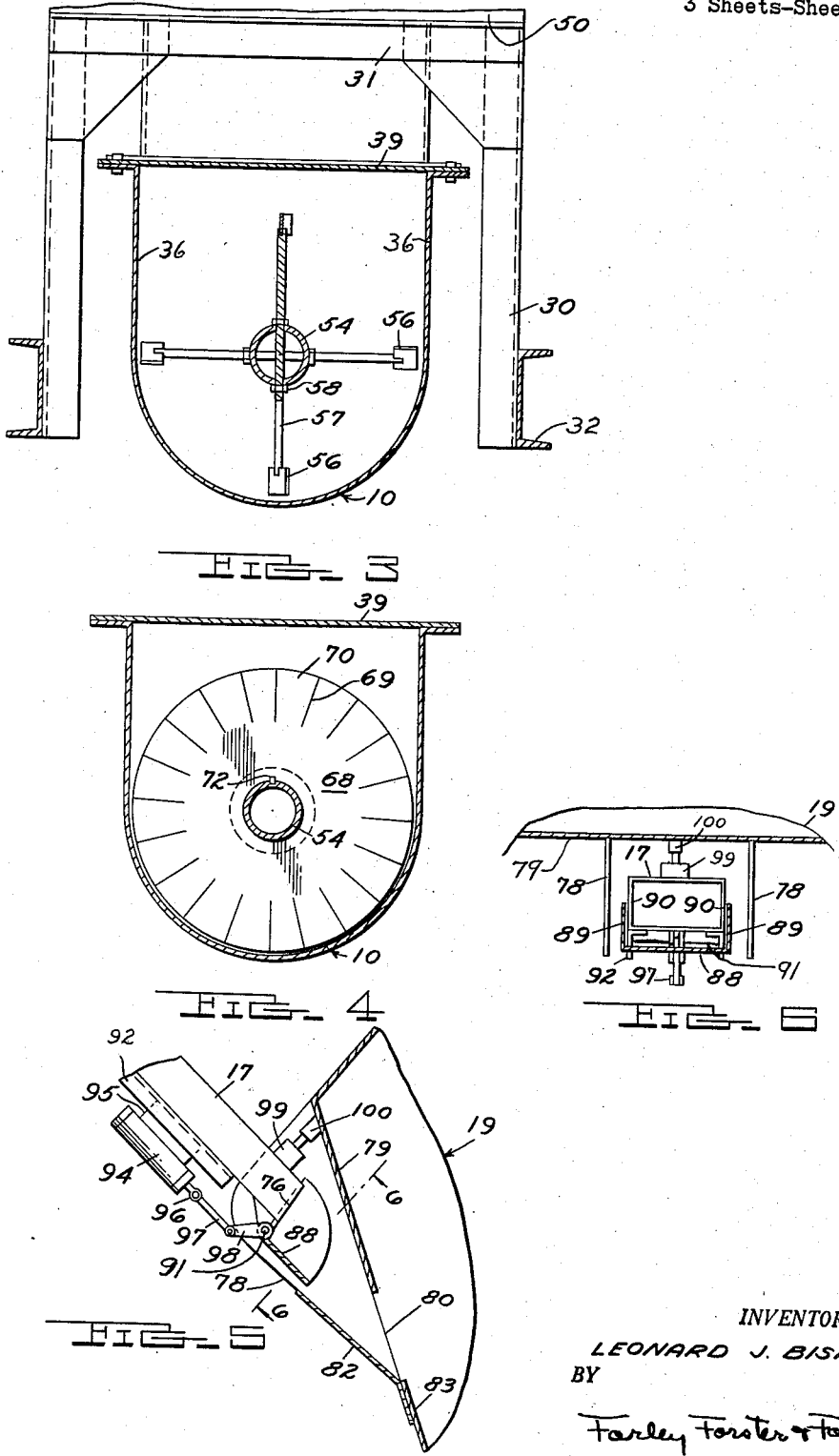
INVENTOR.
LEONARD J. BISHOP $$\text{2,877,524}$$
Patented Mar. 17, 1959

2,877,524

APPARATUS FOR MIXING AND FEEDING SHELL MOLDING MATERIAL

Leonard J. Bishop, Birmingham, Mich., assignor to Mechanical Handling Systems, Inc., Detroit, Mich., a corporation of Michigan Application July 1, 1954, Serial No. 440,729

3 Claims. (Cl. 22—89)

This invention relates to improvements in apparatus for metering, blending and mixing materials employed as ingredients in compositions for forming shell molds, and in apparatus for metering and feeding such shell mold forming composition to the hopper or sandbox of a shell molding machine. The invention is also directed to an improved method for the blending and mixing of such ingredients. Common shell molding compositions include as principal ingredients a dry pulverant material, such as sand, and a thermosetting material, such as resin. A standard blend or mixture of these ingredients is made by the addition of 5 to 7 percent dry powdered resin to the weight of the sand. The resulting mold forming composition, after mixing, tends to be nonhomogeneous due to the relatively small proportion of resin employed and very dusty due to the light powdery characteristics thereof. The mixture tends to settle, and is difficult to handle and deliver to the hopper or sandbox of a mold forming machine without creating dust in the surrounding atmosphere which will settle and cake on any object whose temperature is within the plastic range of the resin.

The present invention provides a blending and mixing method for these two ingredients which results in a more homogeneous mixture and which tends to prevent separation of the sand and resin ingredients thereof. The invention also provides apparatus for handling the ingredients through the steps of metering, blending, mixing and feeding them to the hopper of a mold forming machine in a continuous dust-free operation whose speed or rate can be correlated with the amount of material consumed by the mold forming machine in forming shell molds.

The apparatus required for practicing the invention is arranged in relation to a mixing chamber, which preferably is of a straight-line or continuous type as distinguished from a batch type—that is, the construction and operation of the mixing chamber are such as to permit the various ingredients of the composition to be introduced into the chamber at one end, and a homogeneous shell molding mixture discharged from the other end of the chamber. Means for agitating and advancing the ingredients are included within the mixing chamber, and these means are motivated, preferably by a variable-speed driving unit so that the speed at which the ingredients are mixed and advanced towards the discharge end of the chamber can be controlled. An opening is provided at this discharge end of the mixing chamber through which shell molding composition is delivered to conduit means leading to the hopper or sandbox of a shell molding machine. Metering means are preferably included to regulate the rate of flow of shell molding composition through the discharge opening.

The hopper of the shell molding machine will, in conventional practice, be operated on a cycle which includes a mold forming period and a dwell period. During the mold forming period the hopper is superimposed over a pattern plate, to deposit shell molding composition thereon.

A make-and-break connection is employed between the conduit means leading from the mixing chamber and the hopper of the shell molding machine. This connection is "made' during the dwell period of operation of the hopper, and "broken" during the mold forming period of operation thereof. Valve means are included in the conduit construction for interrupting flow of mold forming composition to the hopper during the mold forming period, and these valve means are opened during the dwell period of the hopper so that the supply of shell molding composition therein can be replenished. Preferably the valve means operate in response to movement of the shell molding machine hopper or sandbox and the rate of flow of shell molding composition is adjusted so that the amount supplied to the hopper during the dwell period will be just sufficient to replenish the amount discharged from the hopper during the mold forming period. The volume of the conduit means between the mixing chamber and hopper is sufficient to provide storage space for the amount of shell molding composition being fed into the conduit from the mixing chamber during the time the sandbox is operating on the mold forming portion of its cycle.

Sand and resin ingredients for forming the shell molding composition are preferably continuously fed to the mixing chamber by devices which accomplish a continuous metering of the quantity of each ingredient, by weight. In the ordinary shell molding composition the amount of resin employed usually ranges between 5 and 7 percent of the weight of sand employed. One of the main features of the present invention is that of supplying a portion of the weight of resin required for the mixture in liquid form. The remaining portion of the weight of resin is supplied in dry powdered form, according to conventional practice. Liquid resin is sprayed on the pulverant or sand being supplied to the mixing chamber. In the preferred construction to be disclosed, this spraying is accomplished by jets playing on a falling column or sheet of sand being delivered from the sand metering device to the mixing chamber. The sand becomes quite evenly coated with liquid resin by this spraying operation, but to insure further uniformity of the liquid coating the sprayed sand is mixed and agitated in the mixing chamber, and then the remaining amount of resin is added in dry powdered form. The mixing chamber is arranged to provide a further agitation and mixing of these ingredients so that powdered resin is deposited all over the wetted sand. The resulting mixture or shell molding composition is extremely homogeneous and very stable. The amount of resin supplied in liquid form is not sufficient to impair seriously the flow properties of the sand, but only enough to apply a very thin surface coating of liquid resin which acts as a binder for the powdered resin, and results in a more intimate mixture of sand and resin and therefor a more uniform, stronger mold.

The invention also is directed to the method of mixing, apart from the particular apparatus shown here for accomplishing it. Generally, this method may be briefly outlined as comprising the following steps: The formation of a shell molding composition, which includes definite proportions of a pulverant material such as sand and a thermosetting material such as resin, by the steps of applying a portion of the quantity of resin on the sand in liquid form, adding the remaining portion of the resin in dry powdered form, and mixing the ingredients in a suitable chamber.

A representative embodiment of the invention is illustrated in the accompanying drawings which comprise the following views:

Fig. 1, a sectional elevation, partly schematic, showing a mixing chamber and devices for metering shell molding composition ingredients thereto;

Fig. 2, an end elevation which includes the metering and mixing devices of Fig. 1 and the hopper of a representative shell molding machine to which the composition formed by the apparatus of Fig. 1 is delivered by a suitable conduit and valve means;

Fig. 3, a transverse sectional elevation taken along the line 3—3 of Fig. 1 and showing the mounting of the mixing chamber and construction of agitating vanes employed therein;

Fig. 4, a similar sectional elevation taken along the line 4—4 of Fig. 1 and showing an end view of a metering wheel employed to regulate the rate at which mold forming composition is discharged from the mixing chamber;

Fig. 5, an enlarged sectional detail showing the relation between the delivery conduit and the construction of the mold forming machine hopper; and Fig. 6, an enlarged sectional detail, taken along the line 6—6 of Fig. 5 of the relation between the end of the discharge spout and filling opening provided in the hopper of the mold forming machine.

Referring to Figs. 1 and 2, the major components of the apparatus shown will first be outlined in their relation to each other, and then described in greater detail.

A troughlike mixing chamber 10 is mounted in an overhead framework generally designated 11, and a pair of automatic feeding and weighing devices 12 and 13 are carried by suitable frame members above the mixing chamber 10. The unit 12 handles sand, which it feeds into the mixing chamber 10 through a duct 14. Dry powdered resin is handled by the unit 13 and fed into the mixing chamber 10 through a duct 15. Mechanism included in the mixing chamber agitates these ingredients and advances them toward the discharge end thereof, where a discharge opening 16 is located, communicating with a conduit 17.

As shown in Fig. 2, conduit 17 leads downwardly and the end thereof registers with a filler neck 18, provided on the side of a sandbox 19 of the shell molding machine. This sandbox 19 is shown in its dwell position, and the shell molding machine construction (not shown) permits the sandbox to be rotated about the shaft 20 from the dwell position to a mold forming position, where the discharge opening 21 of the sandbox is superimposed over the surface of a pattern. Details of a shell molding machine operating in this manner are disclosed in the copending application Serial No. 299,606 of Paul Klamp and Leonard J. Bishop, now Patent No. 2,762,092, issued Sept. 11, 1956.

Thus it can be seen that the apparatus provides for the continuous feeding of ingredients into a mixing chamber and the continuous delivery of shell molding composition from such container to a shell molding machine. The various components outlined above will not be described in greater detail.

The weighing and feeding devices 12 and 13 are standard commercially available units, and hence their construction has been indicated only in schematic form. These units each include a hopper 22 arranged to deliver material to a vibrating feeder 23. The material coming from the discharge end of the feeder 23, as indicated by the arrow 24, falls onto the surface of a belt conveyor 25, which is suspended from a scale generally indicated by the reference 26. A desired weight setting is established on the scale 26, and suitable controls regulate the speed of the feeder 23 and belt conveyor 25, so that this weight of material is delivered from the discharge end 27 of the latter in a given unit of time. Identical reference numerals have been used for similar parts on the feeding unit 13.

Each feeding unit 12 and 13 is mounted on a suitable framework including vertical angle members 30 and transverse horizontal angle members 31. The vertical members 30 are secured to horizontally extending channel members 32 (Fig. 2), forming part of the supporting framework 11.

The mixing chamber 10 is also supported between the frame members 32 upon suitable transverse members 33 and 34 secured thereto, these members 33 and 34 being disposed at either end of the mixing chamber. The end of the chamber adjacent the frame member 33 will be referred to as the "head" end, while the end adjacent the frame member 34 will be referred to as the "discharge" end.

As previously mentioned, the mixing chamber 10 is a long troughlike container having sides 36 and a semicircular bottom panel 37. The container is enclosed by a top 38, a panel 39 of which is removable. Both metering units 12 and 13 are supported above the level of the top 38 of the mixing chamber. Metering unit 12 has a discharge opening 40 in the bottom panel 41 thereof, this opening being located beneath the discharge end 27 of the belt conveyor 25. Discharge opening 40 is of rectangular configuration, and is bounded by the correspondingly shaped conduit 14 leading to an opening 42 in the top of the mixing chamber 10. The transverse walls 43 of this conduit (Fig. 1) are each provided with a recess 44 and a spray nozzle 45 is located in each recess. These spray nozzles 45 are connected to a source of supply of liquid resin, and are of a wide-jet type which will apply a thin fanlike spray to the falling sheet of pulverant material coming from the belt conveyor 25 of the feeder 12 down through the conduit and through the opening 42 into the mixing chamber. Air discharged by the nozzles 45 along the liquid resin in the spraying operation is exhausted from the mixing chamber 10 through a duct 46 located between the feeder units 12 and 13 and communicating with an opening 47 in the top of the mixing chamber 10.

Dry powdered resin metered and fed by the unit 13 is discharged into the mixing chamber 10 through the conduit 15, which connects a discharge opening 50 in the bottom panel of the metering unit 13 with an opening 51 in the top of the mixing chamber 10.

Mounted in the mixing chamber 10 are means for agitating and advancing the ingredients fed to the chamber through the conduits 14 and 15. These means for agitating and advancing comprise a hollow shaft 54, extending the length of the chamber 10 and mounted in bearings 55 in the end panels thereof. Mounted on this shaft 54, in spaced relation, are a number of mixing paddles 56, each mounted on an arm 57 which extends through the hollow shaft and is connected thereto by nuts 58. Each paddle is mounted on its arm 57 at an angle to the longitudinal axis of the shaft, so that when the shaft 54 is rotated in a proper direction, the paddles act to advance the material towards the discharge end of the mixing chamber, as well as agitate the ingredients during this advancing motion.

A variable-speed drive unit is provided for rotating the shaft 54. This unit includes a reducer or gear box 60, whose output shaft 61 is connected by a suitable coupling 62 to the shaft 54. The gear box 60 is driven by a belt 64 from the output pulley of a motor unit 65 of a variable-speed type. The motor unit 65 illustrated is one whose output speed can be regulated by turning the handwheel 66.

Although the rate at which the material is mixed and advanced in the chamber 10 can be regulated by adjusting the speed of the motor unit 65, the invention preferably contemplates the use of additional means to obtain a more precise regulation of the rate at which the material is discharged from the mixing chamber 10 through the conduit 17. In the construction shown, this regulating means comprises a metering disk 68, which, as can be seen from a comparison of Figs. 1 and 4, consists of a circular sheet metal member formed with a series of slits 69 extending radially inwardly from the periphery thereof. The slits 69 form vanes 70, which are bent to a certain pitch angle, in the manner of a propeller. The disk 68 is connected to the shaft 54 for rotation therewith, as by a key 72.

In the operation of the apparatus, the level of the ingredients in the mixing chamber is kept below the level of the shaft 54, and the mold forming composition backs up to this level adjacent hte working face 74 of the disk 68. Upon rotation of the disk 68 through the material, the vanes 70 thereof act to scoop a measured amount of material through the slits in the disk, feeding this material directly to the discharge opening 16 and conduit 17.

The remaining part of the apparatus consists of means for regulating the flow of mold forming material from the end 76 of the discharge tube 17, in response to the position of the hopper or sandbox 19 of the shell molding machine employed, acting in conjunction with means for automatically coupling the discharge tube and the sandbox when the latter is in position to receive material from the discharge end of the tube 17. This construction is shown in Figs. 2, 5 and 6.

The sandbox 19 is provided with a loading funnel, generally designated 18, and composed of a pair of plates 78, projecting outwardly from the side wall 79 of the sandbox, which is equipped with a filler opening 80. The opening 80 is partly shrouded by a plate 82 connected between the side plate 78 and to the side 79 of the sandbox at 83 (Fig. 5). During the operation of the mold forming machine the sandbox is rotated about the shaft 20 in a clockwise direction from the dwell position shown in Fig. 2 to a mold forming position. Reference is again made to the aforementioned patent No. 2,762,092 of Paul Klamp and Leonard J. Bishop, for a full description of this motion. The discharge tube 17 is stationary, being rigidly secured to the frame structure, as by a bracket 86 (Fig. 2) in a position where the discharge end 76 of the tube 17 registers with the loading funnel 18 of the sandbox when the latter is in its dwell or loading position, as shown in Fig. 2.

A suitable valve is provided to cover the discharge end 76 of the tube 17 during the interval the sandbox moves away from the position shown in Fig. 2, to the mold forming position thereof. The valve structure illustrated comprises a valve plate 88 connected to a pair of side panels 89, which straddle the sides 90 of the discharge tube 17. This valve is mounted on a shaft 91 carried between brackets 92, secured to the discharge tube.

The means shown for regulating the position of the valve plate 88 in response to the position of the sandbox 19 comprise a fluid pressure actuating cylinder 94, secured to the discharge tube 17 by a suitable connection 95 and having its rod 96 connected by a link 97 to a crank 98 secured to the valve shaft 91. Actuation of the cylinder 94 is regulated by a suitable control device 99, shown as carried by the discharge tube and adapted to be contacted by an actuating member 100, secured to the sandbox. The parts are shown in Fig. 5 with the valve 88 in open position for the discharge of material from the tube 17 into the sandbox. When the sandbox moves away from this position, in a clockwise direction, or to the right as the parts are viewed in Fig. 5, the actuating member 100 carried by the sandbox moves out of contact with the control device 99, resulting in an actuation of the cylinder 94 to close the valve 88. When the sandbox returns to its dwell or loading position, the actuating member 100 again contacts the control device 99, and the valve 88 is opened by the actuating cylinder 94 in response to this contact.

The sandbox of any mold forming machine will be operated on a definite time cycle, with a given interval required for the mold forming operation and a given interval for the dwell period following each mold forming operation, during which the mold is cured and stripped from the pattern plate. Any particular mold being formed will require a definite quantity of mold forming composition from the sandbox during each mold forming operation. The present construction permits the supply of material in the mold box to be replenished following each mold forming operation with an amount of new mold forming composition approximately equal to the amount employed in making each mold. This enables the quantity of mold forming composition contained in the sandbox to be maintained practically constant, and in an amount which results in best mold forming operation of the molding machine.

Each component of the apparatus disclosed can be regulated to accomplish this result, first by establishing the proper setting of the metering and feeding devices 12 and 13 so that they will continuously supply the proper quantity of mold forming ingredients, in the correct proportion, for any interval of time. Regulation of the speed of the mixing and advancing apparatus of the mixing chamber 10 permits a corresponding regulation or control of the rate of discharge of material from the mixing chamber to the tube 17 by the metering wheel 68. Since the mold forming composition is being continually discharged from the mixing chamber and only intermittently loaded into the sandbox, the volume provided by the discharge tube 17 must be made great enough to act as a storage space for the accumulation of material coming from the mixing chamber during the mold forming interval of operation of the sandbox—that is, during the interval the valve 88 at the end of the discharge tube is closed.

The arrangement of the component parts of the apparatus achieves the improved method of mixing and feeding the mold forming material previously outlined. The pulverant material, or sand, which determines the amount of the thermosetting material or resin employed in the mold forming composition, is fed in metered quantity to the head end of the mixing chamber 10 by gravity, falling as a sheet from the end 27 of the conveyor 25. This falling sand is subjected to a spray of thermosetting material in liquid form from the nozzles 45. The rate of discharge from the nozzles is adjusted so that only a small proportion of the total amount of resin required for the amount of sand being supplied is applied in liquid form. For example, the method may be satisfactorily practiced when the amount of resin applied in liquid form from the nozzles 45 is from 5 to 10 percent of the total amount of resin required. The sand, coated with liquid resin, falls into the mixing chamber and begins to be agitated and advanced by the paddles 56. Preferably the arrangement is such as to provide an appreciable interval during which the sprayed sand is agitated and mixed in the mixing chamber, before the addition of any other ingredient. During this interval of mixing, any air supplied as part of the spraying operation is exhausted through the tube 46. The metering unit 13 is set to supply an amount of resin in dry powdered form, which, when added to the liquid resin, makes the proper proportion of resin and sand. This dry powdered resin is supplied through the conduit 15 to the liquid resin coated sand which has been mixed to improve the distribution of the coating on the individual grains of sand.

Further mixing of the coated sand and dry powdered resin takes place as the ingredients are advanced toward the discharge end of the chamber 10 until a homogeneous composition results by the time the ingredients meet the face 74 of the metering wheel 68.

This homogeneous composition is continuously discharged into the tube 17 feeding the hopper of the shell molding machine and is automatically and intermittently fed to the sandbox through the operation of the valve means and control mechanism therefor previously described.

I claim:

1. Apparatus for metering and blending materials for forming a shell molding composition, said materials including a pulverulent material such as sand and a thermosetting material, comprising a mixing chamber having a generally semi-cylindrical elongated trough, means for advancing and agitating material along said trough axially thereof from one end to the other, a pulverulent material metering unit arranged above said mixing chamber, and an enclosed conduit connected to the discharge of said metering unit and to said mixing chamber, said conduit being disposed generally vertically, spray means located in said conduit and adapted to apply a liquid coating to pulverulent material following therethrough, a unit for metering dry thermosetting material, enclosed conduit means connected to the discharge of said metering unit and to said mixing chamber, said pulverulent conduit being arranged to deliver pulverulent material to the advancing means of said mixing chamber and said thermosetting material, conduit means being arranged in spaced relation to said pulverulent conduit in the direction of travel of pulverulent material in said mixing chamber whereby dry thermosetting material is added to sprayed and agitated pulverulent material, said mixing chamber having a cover along the length thereof with spaced openings for registry with said conduits, and an exhaust opening located in said cover intermediate the location of said conduits.

2. Apparatus for continuously metering and mixing a composition of a pulverant material and a thermosetting material suitable for forming shell molds, comprising a mixing chamber, said mixing chamber having a discharge opening adjacent one end thereof, means for delivering metered quantities of pulverant material and thermosetting material to the other end of said mixing chamber, said mixing chamber having agitating and advancing means interposed between the ends thereof and adapted to mix and advance the material delivered to said chamber toward the discharge end thereof, said agitating and advancing means comprising a shaft, a series of vane members carried by said shaft and adapted to mix and advance said materials upon rotation of said shaft, means for driving said shaft, metering means associated with said agitating and advancing means and located in said mixing chamber in advance of the discharge opening thereof, said metering means comprising a disk coupled to said shaft and having vanes formed therein to discharge a measured amount of mold forming composition upon each revolution of said shaft, and means for driving said agitating and advancing means and said metering means at a selectable speed.

3. Apparatus as set forth in claim 2, wherein said mixing chamber comprises a vessel which includes a generally semicylindrical portion formed on an axis substantially coincident with the axis of said shaft, said vessel having a discharge opening in said semispherical portion thereof located on the discharge side of said metering disk.

References Cited in the file of this patent

UNITED STATES PATENTS

| | | |
|---|---|---|
| 942,051 | Baxter | Dec. 7, 1909 |
| 947,129 | Robeson | Jan. 18, 1910 |
| 1,204,348 | Doherty | Nov. 7, 1916 |
| 2,252,589 | Whitmore et al. | Aug. 12, 1941 |
| 2,346,742 | Gaddie | Apr. 18, 1944 |
| 2,568,821 | Perrot | Sept. 25, 1951 |
| 2,646,260 | Bates | July 21, 1953 |
| 2,657,974 | Cook et al. | Nov. 3, 1953 |
| 2,751,650 | Froberger | June 26, 1956 |

OTHER REFERENCES

A. M. Foundryman, May 1954, pages 138–143.